(12) United States Patent
Delmonico et al.

(10) Patent No.: US 8,037,000 B2
(45) Date of Patent: Oct. 11, 2011

(54) SYSTEMS AND METHODS FOR AUTOMATED INTERPRETATION OF ANALYTIC PROCEDURES

(75) Inventors: Robert M. Delmonico, White Plains, NY (US); Tamir Klinger, Brooklyn, NY (US); Bonnie Kathryn Ray, South Nyack, NY (US); Padmanabhan Santhanam, Yorktown Heights, NY (US); Clay Edwin Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 12/047,385

(22) Filed: Mar. 13, 2008

(65) Prior Publication Data

US 2009/0234791 A1  Sep. 17, 2009

(51) Int. Cl.
*G06F 17/00* (2006.01)
*G06N 5/00* (2006.01)

(52) U.S. Cl. .............. 706/45; 706/46; 706/47; 706/52; 706/62

(58) Field of Classification Search .............. None
See application file for complete search history.

(56) References Cited

U.S. PATENT DOCUMENTS

| 7,167,846 | B2 | 1/2007 | Provost et al. | |
| 7,464,021 | B1 * | 12/2008 | Myers et al. | 704/7 |
| 7,475,050 | B2 * | 1/2009 | Larson | 706/47 |
| 7,716,123 | B2 * | 5/2010 | Dodd et al. | 705/38 |
| 2004/0078696 | A1 * | 4/2004 | Bowers et al. | 714/41 |
| 2008/0319942 | A1 * | 12/2008 | Courdy et al. | 707/3 |

* cited by examiner

*Primary Examiner* — Omar Fernandez Rivas
(74) *Attorney, Agent, or Firm* — Tutunjian & Bitetto, P.C.; Stephen Kaufman, Esq.

(57) ABSTRACT

Systems and methods are provided to produce natural language interpretations of analytic operations in an automated manner, by associating with each analytic procedure a set of parameters that determine the interpretation of the resulting analysis.

23 Claims, 2 Drawing Sheets

SYSTEMS AND METHODS FOR AUTOMATED INTERPRETATION OF ANALYTIC PROCEDURES

TECHNICAL FIELD

The invention generally relates to systems and methods for automated interpretation of analytic procedures and, in particular, systems and methods for automatically interpreting the results of analytical procedures and presenting the interpretation results in human-understandable form.

BACKGROUND

Technological innovations have increased the capability for collecting and retaining large amounts of electronic information that may be accessed and used for various applications such as educational, scientific, commercial and entertainment applications. As the amount of electronic content continues to increase, it becomes increasingly important to implement automated data analysis tools to allow individuals to organize and utilize such data. For example, data mining methods can be employed for automatically processing a large corpus of data to determine useful data associations and patterns with the large data corpus. Moreover, large enterprises may employ automated business intelligence systems to analyze various types of business data, e.g., e.g. weekly sales figures, revenues outstanding by region, etc., relevant to the particular business. However, existing solutions for interpreting information typically explain the analytic process rather than the meaning of the data involved in the analytic process and the resulting output of the data analysis in the context of a particular domain, such that the data analysis results are often difficult to interpret by a non-technical audience.

For example, although data mining methods can determine associations and patterns of data within a large corpus of data, such methods simply provide a means of discovering previously unknown knowledge in a data set but do not address the question of how to explain that discovery to a non-technical audience. The "translation" of the analytic output into natural language that reflects the context of the problem domain typically requires the assistance of a skilled analyst, thus limiting the ability of the larger population to analyze and interpret information on-demand. Moreover, automated business intelligence systems typically produce canned and ad-hoc reports based primarily on simple summarization of underlying data values, e.g. weekly sales figures, revenues outstanding by region, etc, while is left to the reader of the report to examine the summary values and determine what they imply. More complex analytic procedures, such as applying a statistical test for the presence of a true downward trend in weekly sales are often not employed, as the results of such statistical tests are difficult to convey in an automated manner. Other conventional data processing methods include automated processes for translating rule evaluation results into natural language but only for the small set of data used in its rules, but do not provide a general mechanism for explaining computations unrelated to the purpose of the rule execution.

Predictive Model Markup Language (PMML) is an XML-based language which provides representation of the data mining models so as to enable the exchange of the standard data mining models based on the standard data mining techniques such as Association. PMML language provides a general purpose language for describing statistical and data mining models but does not provide any mechanism to explain the results of applying those models. A need therefore exists for improved systems and methods that provide a general domain-independent method of explaining analytical computations of a process in a human-understandable form, which overcome the problems associated with conventional methods.

SUMMARY OF THE INVENTION

Exemplary embodiments of the invention generally include systems and methods for automated interpretation of analytic procedures and, in particular, systems and methods for automatically interpreting the results of analytical procedures for system processes and presenting the interpretation results in human-understandable form.

In one exemplary embodiment of the invention, an automated method is provided to perform machine explanation of processing results. The method includes obtaining results of an analytic procedure applied to input data, obtaining an explanation template associated with the analytic procedure, interpreting the results of the analytic procedure using the associated explanation template, and outputting an interpretation of the results in human readable form.

In one exemplary embodiment, the results of the analytic procedure are interpreted using the associated explanation template by applying one or more result values as an input parameter to the explanation template for processing. In another exemplary embodiment, the results of the analytical procedure are interpreted using the associated explanation template by applying one or more the input data values of the analytical procedure as an input parameter to the explanation template for processing.

In yet another exemplary embodiment of the invention, the results of the analytic procedure are interpreted using the associated explanation template by processing the results of the analytical procedures using logic processing embedded as snippets within the explanation template. The embedded snippets may include procedure calls to libraries to process one or more results values of the analytical procedure.

In another embodiment of the invention, explanation templates are authored using a domain-independent scripting language in which set of parameters that are associated with the analytic procedure are defined and used to interpret output results of the analytical procedure by substituting actual parameter and result values that are included in the results of the analytical procedure into the explanation template to produce a natural language explanation of the processing results.

These and other embodiments, aspects, features and advantages of the present invention will be described or become apparent from the following detailed description of preferred embodiments, which is to be read in connection with the accompanying drawings.

DETAILED DESCRIPTION OF EXEMPLARY EMBODIMENTS

Exemplary systems and methods for automated interpretation of analytic procedures will now be discussed in further detail with reference to the exemplary embodiments of FIGS.

1 and 2, for example. It is to be understood that the systems and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., hard disk, magnetic floppy disk, RAM, CD ROM, DVD, ROM and flash memory), and executable by any device or machine comprising suitable architecture.

It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
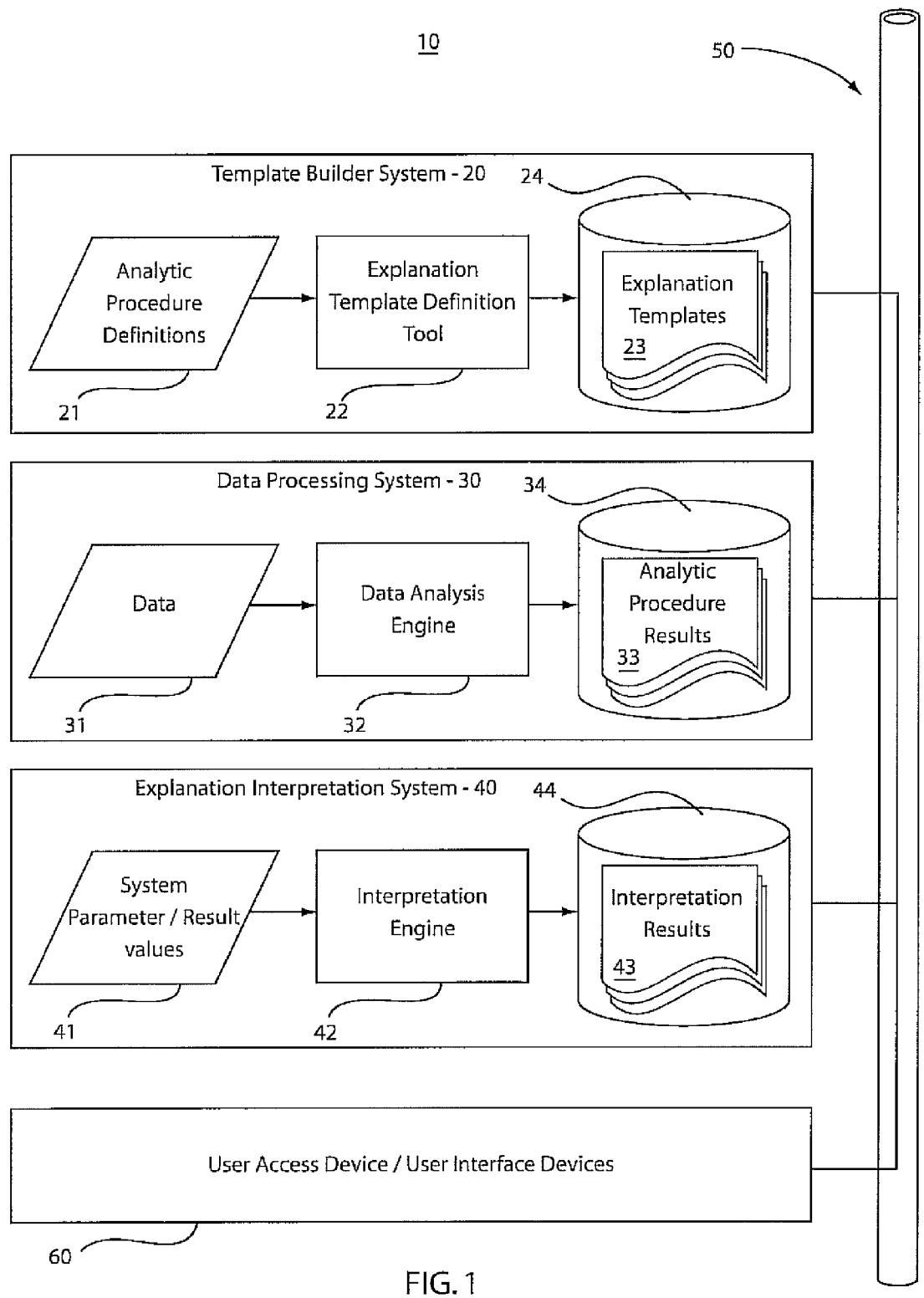
FIG. 1 illustrates a system for automated interpretation of analytic procedures according to an exemplary embodiment of the invention.

FIG. 1 is a schematic block diagram of a computing system (10) for automated interpretation of analytical results according to an exemplary embodiment of the invention. In particular, FIG. 1 is a high-level depiction of a computing system (10) that generally comprises a template builder system (20), a data processing system (30), and an interpretation system (40) which are in communication over a communications system (50). A user can access and interact with each of the various systems (20), (30), and (40) over the communications system (50) via an access device or UI devices (60) implementing suitable I/O interfaces and APIs, for example.

The data processing system (30) comprises a data processing engine (32) that performs one or more analytical procedures on input data (31) and outputs data processing results (33) which are temporarily or persistently stored in a data storage medium (34) for subsequent access and analysis. The template builder system (20) comprises an explanation template definition tool (22) which is used by a system builder to construct explanation templates (23) based on analytic procedure definitions (21) for analytic procedures associated with the data processing system (30). The resulting templates (23) may be persistently stored in a storage system (24) associated with the template builder system (20).

In one exemplary embodiment of the invention, the template builder system (20) may implement a standard domain-independent scripting language that allows a system builder to construct explanation templates (23) for analytic procedures performed by the data processing system (30). The process of defining explanation templates (via definition tool (22)) may be performed as a separate process that is independent of the framework of the data processing system (30). In other words, the explanation templates (23) may be defined independently of the actual system procedures, whereby no modification or revision of the analytical procedures of the system (30) is needed to produce corresponding explanation templates (23). The data processing system (30) may be any system whose procedures can be associated with explanation templates, including, without limitation, statistical systems, rule-based systems, general procedures in programming languages, etc.

The interpretation system (40) automatically generates natural language interpretations of the resulting analytic operations using the explanation templates (23) for the given system procedures. The explanation interpretation system (40) generally includes an interpretation engine (42) that processes input data (41) and uses the explanation templates (23) to produce interpretation results (43) that are stored in storage device (44). The interpretation results can be rendered in human-readable formats (e.g., display, printed text, voice output, etc.) explaining the data processing results (32) output from the system (30). The explanation interpreter system (40) can be connected to any data processing system (30) system which produces procedure results and metadata independent of purpose or programming language.

In one exemplary embodiment of the invention, natural language interpretations of analytic operations are produced in an automated manner by associating with each analytic procedure a set of parameters that determine the interpretation of the resulting analysis. In particular, a set of parameters is defined to be associated with a specific analytic procedure. The parameters, together with the results of the analytic procedure and attributes of the data on which the analytic procedure operates, determine a natural language interpretation of the procedure results. Moreover, in other exemplary embodiments, code can be created for automatic generation of natural language describing the analysis results. For instance, the scripting language can include code to control the output by conditionally outputting some text based on a parameter value, for example, or outputting one or more segments or portions of text depending on the parameter values, etc. (e.g., loops). In other embodiments, natural language interpretations of combinations of analytic results can be generated, where the combinations may present a hierarchical structure. Example embodiments of these features will be described in further detail below.

In the exemplary embodiment of FIG. 1, each of the template building, data processing and interpretation systems (20), (30) and (40) may be a hardware system, software system, or combination hardware/software system, which resides/executes on the same or different computing nodes over the communications system (50), wherein the communications system (50) may be a computer network such as a global communications network (Internet), a LAN (local area network), WAN (wide area network), WLAN (wireless LAN), etc., in a distributed computing environment. In fact, the template builder system (20) and interpretation system (40) may be implemented as part of a web services or e-business service offerings provided by a third party under a SLA or licenses. By way of specific example, the interpretation system (40) may be part of (i) hardware services for providing explanation and analysis for computing system configuration, server and/or storage optimization, reliability analysis, etc., (ii) or software service, for example, software billed by usage rather than licensed per CPU or user, or (iii) in a services-oriented system, for example, as software in a Services Oriented Architecture, providing technical services (for example, middleware implementation, database optimization, application maintenance), professional services (for example, management consulting, business process outsourcing), scientific services (for example, materials research, life sciences research, logistics research), etc.

Figure 2:
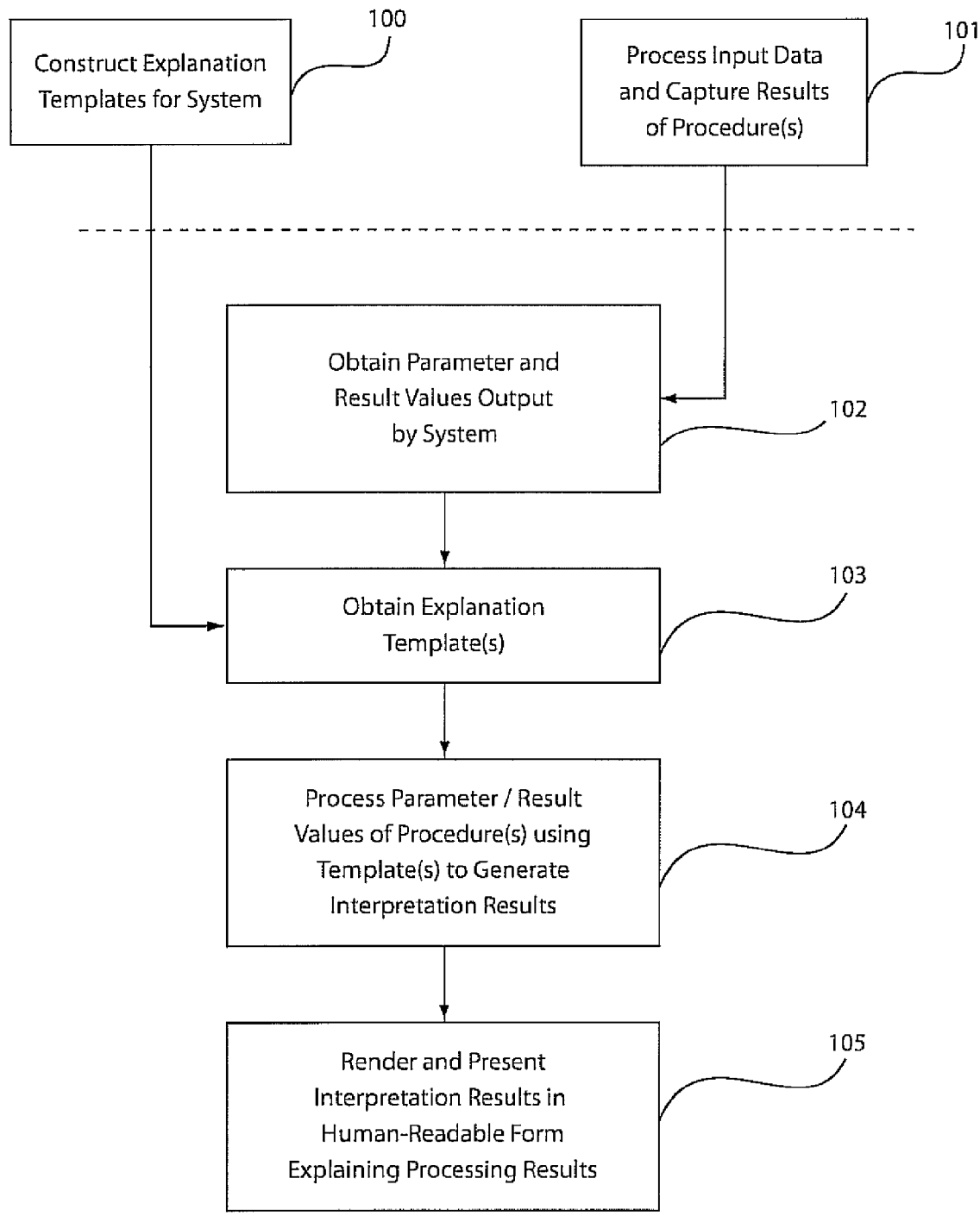
FIG. 2 illustrates a method for automated interpretation of analytic procedures according to an exemplary embodiment of the invention.

FIG. 2 is a flow diagram illustrating a method for automated interpretation of analytic procedures according to an exemplary embodiment of the invention. For purposes of illustration, the various processing steps of FIG. 2 will be discussed with reference to the exemplary system components of FIG. 1, where it is assumed for illustrative purposes that the data processing system (30) is a statistical system that analyses data to determine whether the data is statistically significant. In FIG. 2, an initial process is to construct explanation templates for the system (step 100). By way of specific example, the system builder (or service provider) will use the template building system (20) to construct explanation templates for each procedure of the system (30) for which an explanation will be required. Explanation templates may have natural language text as well. The following example services to illustrates inventive principles regarding the construction and use of explanation templates for give system procedures.

For example, assume that the data analysis engine (32) executes an analytic procedure TestSignificance which has four parameters:

parameter 0: direction, a direction (<, >).
parameter 1: test data, a vector of test data.
parameter 2: test data name, the descriptive name of the test data.
parameter 3: test value, the test value. It returns the p-value for the test.

The following exemplary explanation template can be constructed for the procedure TestSignificance.

```
<template procedure = "TestSignificance">
  The chance of observing an average value of
<%procedure.parameter[3] .name%> which is
  <%procedure.parameter[0] .value%> or equal to
  <%average(procedure.parameter[1].value)%> if in fact the true mean
  <% procedure.parameter[1] .name%> is <%procedure . parameter[3]
  .value%> is approximately <%procedure . result%>%.
</template>
```

In this example the text snippets enclosed in "<% %>" brackets and highlighted in bold text reference the actual parameter and result values output from the data processing system (30) that will be supplied to the explanation interpreter system (40) when the system procedure is executed. In addition to the name and value of the procedure parameters and result, the embedded snippets may include procedure calls to libraries to compute standard functions such as "average," or include conditional statements and loops allowing for the full capabilities of a programming language in constructing explanations. Moreover, built-in "system" variables such as "procedure" are provided to allow referencing of parameters. For example, in the above example code, the procedure parameter [0] is a reference to the first parameter (i.e., parameter 0: direction).

Referring again to FIG. 2, when the data processing system (30) is invoked to process input data, the system will process the input data using one or more relevant system procedures (via the data analysis engine (32)) and the results of the system procedure(s) are captured (101) (e.g., analytical procedure results (32) stored in data store (34)), FIG. 1) The explanation interpreter (40) will obtain the parameter and result values output from the data processing system (step 102) and obtain the relevant explanation templates (step 103) that are applied to the processing results to interpret procedure results and to produce explanations of the procedure results.

The explanation interpreter system (40) may take the actual parameter and result values output from the data processing system (30) and substitute the values into the explanation template to produce a final explanation for the processing result (step 104). The interpretation system (40) can process elements of the explanation templates that specify content and logic processing. Such processing includes, for example, processing input parameters, conditional logic processing, processing embedded SQL queries, etc. In addition, a given template can have code for calling library functions to perform other types of user-defined processes such as web service, data access, application programs, etc. Again, the explanation template code and procedures can be defined and authorized using a general purpose language and independent of the actual system procedures.

Thereafter, the system can render and present the interpretation results in a human-understandable form in any suitable UI modality (e.g., display, spoken output, etc.). For example, if the procedure TestSignificance is run with the parameters ">" for direction, with data having a mean value of 4.3 as the test data, "response time (sec)" for the test data name, and 3.0 for the test value, and the result of the procedure is 32, the resulting explanation may be:

The chance of observing an average value of response time (see) which is greater than or equal to 4.3 if in fact the true mean response time (sec) is 3.0 is approximately 32%.

Although illustrative embodiments have been described herein with reference to the accompanying drawings, it is to be understood that the invention is not limited to the precise system and method embodiments described herein, and that various other changes and modifications may be affected therein by one or ordinary skill in the art without departing from the scope or spirit of the invention. All such changes and modifications are intended to be included within the scope of the invention as defined by the appended claims.

What is claimed is:

1. An automated method for machine explanation of processing results, comprising:
  obtaining results of an analytic procedure applied to input data;
  obtaining an explanation template associated with the analytic procedure;
  interpreting the results of the analytic procedure using the associated explanation template, wherein interpreting the results of the analytic procedure comprises processing the results using a decision making operation embedded as a snippet within the explanation template for determining whether a portion of text is to be output as part of a natural language explanation; and
  outputting an interpretation of the results in human readable form.

2. The method of claim 1, wherein interpreting the results of the analytic procedure using the associated explanation template comprises applying one or more result values as an input parameter to the explanation template for processing.

3. The method of claim 1, wherein interpreting the results of the analytic procedure using the associated explanation template comprises applying one or more the input data values of the analytical procedure as an input parameter to the explanation template for processing.

4. The method of claim 1, wherein the decision making operation uses at least one of logic processing, a loop or a library function to determine whether the portion of text is to be output as part of a natural language explanation.

5. The method of claim 4, wherein the embedded snippets include procedure call to libraries to process one or more results values of the analytical procedure.

6. The method of claim 1, wherein the explanation template is authored using a domain-independent scripting language.

7. The method of claim 1, wherein the explanation template includes a set of parameters that are associated with the analytic procedure and which are used to interpret output results of the analytical procedure.

8. The method of claim 1, wherein interpreting the results of the analytic procedure using the associated explanation template comprises substituting actual parameter and result values that are included in the results of the analytical procedure into the explanation template to produce a natural language explanation of the processing results.

9. The method of claim 1, wherein the decision-making operation comprises a conditional logic operation which determines whether the portion of text is to be output as part of the interpretation based on at least one parameter value associated with the analytic procedure.

10. The method of claim 1, wherein the at least one embedded element includes a call to a library function which provides a web service or executes an application program in producing the interpretation.

11. A program storage device readable by a computer, tangibly embodying a program of instructions executable by the computer to perform methods steps for machine explanation of processing results, the method steps comprising:
    obtaining results of an analytic procedure applied to input data;
    obtaining an explanation template associated with the analytic procedure;
    interpreting the results of the analytic procedure using the associated explanation template, wherein interpreting the results of the analytic procedure comprises processing the results using a decision making operation embedded as a snippet within the explanation template for determining whether a portion of text is to be output as part of a natural language explanation; and
    outputting an interpretation of the results in human readable form.

12. The program storage device of claim 11, wherein the instructions for interpreting the results of the analytic procedure using the associated explanation template comprise instructions for applying one or more result values as an input parameter to the explanation template for processing.

13. The program storage device of claim 11, wherein the instructions for interpreting the results of the analytic procedure using the associated explanation template comprise instructions for applying one or more the input data values of the analytical procedure as an input parameter to the explanation template for processing.

14. The program storage device of claim 11, wherein the instructions for interpreting the results of the analytic procedure comprise a decision making operation which uses at least one of logic processing, a loop or a library function to determine whether the portion of text is to be output as part of a natural language explanation.

15. The program storage device of claim 14, wherein the embedded snippets include procedure call to libraries to process one or more results values of the analytical procedure.

16. The program storage device of claim 11, wherein the explanation template is authored using a domain-independent scripting language.

17. The program storage device of claim 11, wherein the explanation template is defined to include a set of parameters that are associated with the analytic procedure and which are used to interpret output results of the analytical procedure.

18. The program storage device of claim 11, wherein the instructions for interpreting the results of the analytic procedure using the associated explanation template comprises substituting actual parameter and result values that are included in the results of the analytical procedure into the explanation template to produce a natural language explanation of the processing results.

19. An automated method for authoring an explanation template to process results of an analytical procedure, comprising:
    receiving user input comprising information regarding an analytic procedure;
    processing user commands to associate one or more parameters with the analytical procedure; and
    processing user commands to construct an explanation template for the analytical procedure based on the associated one or more parameters of the analytical procedure,
    wherein the explanation template can be applied to output results of the analytical procedure to generate a natural language explanation of the output results, the results being processed by a decision making operation embedded as a snippet within the explanation template for determining whether a portion of text is to be output as part of the natural language explanation.

20. The method of claim 19, wherein the explanation template is constructed using a domain-independent scripting language.

21. The method of claim 19, wherein the one or more associated parameters correspond to one or more result values of processing results that may be output from the analytic procedure and passed as input values to the explanation template for processing.

22. The method of claim 19, wherein the one or more associated parameters correspond to one or more input data values that may be input to the analytical procedure and passed as input values to the explanation template for processing.

23. A computer system, comprising:
    a data processing system comprising one or more analytical procedures capable of processing input data and outputting processing results;
    a storage device comprising explanation templates associated with one or more of the analytical procedures; and
    a results interpretation system adapted to obtain an explanation template associated with an analytic procedure, interpret the results of the analytic procedure using the associated explanation template, process any elements embedded as a snippet in the explanation template which specify a decision-making operation for determining whether a portion of text is to be output as part of a natural language explanation, and output an interpretation of the results in human readable form.

* * * * *